US012638865B2

(12) United States Patent
Ma et al.

(10) Patent No.: US 12,638,865 B2
(45) Date of Patent: May 26, 2026

(54) GIMBAL AND GIMBAL CONTROL METHOD

(71) Applicant: SZ DJI TECHNOLOGY CO., LTD., Shenzhen (CN)

(72) Inventors: Tianhang Ma, Shenzhen (CN); Yang Zhao, Shenzhen (CN); Xiaoxuan Sun, Shenzhen (CN); Qinghe Fan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 470 days.

(21) Appl. No.: 18/136,894

(22) Filed: Apr. 20, 2023

(65) Prior Publication Data

US 2023/0266775 A1 Aug. 24, 2023

Related U.S. Application Data

(63) Continuation of application No. PCT/CN2020/122235, filed on Oct. 20, 2020.

(51) Int. Cl.
| | |
|---|---|
| *G03B 17/56* | (2021.01) |
| *F16M 11/10* | (2006.01) |
| *F16M 11/20* | (2006.01) |
| *F16M 13/04* | (2006.01) |
| *G05B 19/4155* | (2006.01) |
| *G05D 3/20* | (2006.01) |

(52) U.S. Cl.
CPC ............. *G05D 3/20* (2013.01); *F16M 11/105* (2013.01); *F16M 11/2064* (2013.01); *F16M 13/04* (2013.01); *G03B 17/561* (2013.01); *G05B 19/4155* (2013.01); *G05B 2219/34013* (2013.01)

(58) Field of Classification Search
CPC ........ G11B 19/042–043; H04N 23/667; G03B 17/561
See application file for complete search history.

(56) References Cited

U.S. PATENT DOCUMENTS

| | | | | | |
|---|---|---|---|---|---|
| 10,812,698 | B1 * | 10/2020 | Zhou | .................. | H04M 1/0264 |
| 11,388,275 | B2 * | 7/2022 | Liao | ...................... | G03B 30/00 |
| 11,402,729 | B2 * | 8/2022 | Liu | ........................ | H04N 23/50 |

FOREIGN PATENT DOCUMENTS

| | | |
|---|---|---|
| CN | 103051772 A | 4/2013 |
| CN | 103634464 A | 3/2014 |
| CN | 104460696 A | 3/2015 |

(Continued)

OTHER PUBLICATIONS

International Search Report and Written Opinion mailed on Jul. 23, 2021, received for PCT Application PCT/CN2020/122235, filed on Oct. 20, 2020, 9 pages including English Translation.

*Primary Examiner* — Leon W Rhodes, Jr.
(74) *Attorney, Agent, or Firm* — ANOVA LAW GROUP, PLLC

(57) ABSTRACT

A gimbal and a gimbal control method are disclosed. The gimbal control method may include: acquiring attitude information of a gimbal; determining whether the gimbal is in a falling state based upon the attitude information; and when the gimbal is in the falling state, triggering a protection mode and controlling the gimbal to rotate to a set attitude. The set attitude may be an attitude at which the gimbal is not easy to be broken from falling, thereby reducing the probability of the gimbal being broken from falling.

20 Claims, 9 Drawing Sheets

(56) References Cited

FOREIGN PATENT DOCUMENTS

| | | | | |
|---|---|---|---|---|
| CN | 105599914 | A | 5/2016 | |
| CN | 107395855 | A | 11/2017 | |
| CN | 108093099 | A | 5/2018 | |
| CN | 108255201 | A | 7/2018 | |
| CN | 108778931 | A | 11/2018 | |
| CN | 108891617 | A | 11/2018 | |
| CN | 110809689 | A | 2/2020 | |
| CN | 111240370 | A | 6/2020 | |
| CN | 111279113 | A | 6/2020 | |
| GB | 2416036 | A * | 1/2006 | .......... G01P 15/0891 |
| WO | 2018/147522 | A1 | 8/2018 | |

* cited by examiner

GIMBAL AND GIMBAL CONTROL METHOD

CROSS-REFERENCE TO RELATED APPLICATION

The present application is a continuation of International Application No. PCT/CN2020/122235, filed Oct. 20, 2020, the entire contents of which being incorporated herein by reference in its entirety.

TECHNICAL FIELD

The present disclosure relates to the technical field of gimbal, and particularly relates to a gimbal and a gimbal control method.

BACKGROUND

A gimbal is a device to achieve attitude stability control of a target object, in other words, to maintain the attitude of the target object stationary while the target object is in motion.

Taking photography as an example, the gimbal may be a stabilization gimbal, which may be acted as a support device for installing and fixing a camera. After the stabilization gimbal is applied, a photographer can shoot a stable picture in the process of movement. In the practical task of commercial aerial photography, photography, cruise surveillance, or airborne platforms, most of them must use the gimbal to stabilize the view of the camera in order to keep the shooting picture clear and stable.

Taking the three-axis gimbal as an example, the gimbal is mainly composed of an IMU (inertial measurement unit) feedback system composed of a three-axis gyroscope and a three-axis acceleration sensor, and servo motors. There are three servo motors distributed on the support arm of the gimbal, which are respectively responsible for the rotation in three directions of pitch, roll and yaw. Because the gimbal includes the above rotating mechanism, the structure of the gimbal is not robust, and when a user drops the gimbal during operation, the gimbal may be easily damaged, broken, or crushed.

SUMMARY

The present disclosure provides a gimbal and a gimbal control method, which may reduce the probability of the gimbal being damaged from falling.

According to a first aspect of the present disclosure, a gimbal control method is provided, which may include:

acquiring attitude information of a gimbal;

determining whether the gimbal is in a falling state based upon the attitude information; and upon determining that the gimbal is in the falling state, triggering a protection mode and controlling the gimbal to rotate to a set attitude.

According to a second aspect of the present disclosure, a gimbal is provided, which may include a gimbal body and a processor electrically connected to the gimbal body, the processor being configured to:

determine whether the gimbal is in a falling state based upon attitude information of the gimbal; and upon determining that the gimbal is in the falling state, trigger a protection mode and control the gimbal body to rotate to a set attitude.

Thus, according to the gimbal control method provided by some embodiments of the present disclosure, when it is determined that the gimbal is in a falling state, the protection mode is triggered and the gimbal is controlled to rotate to a set attitude, which may be understood as an attitude at which the gimbal is not easy to be broken from falling, so as to reduce the probability that the gimbal is broken from falling.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
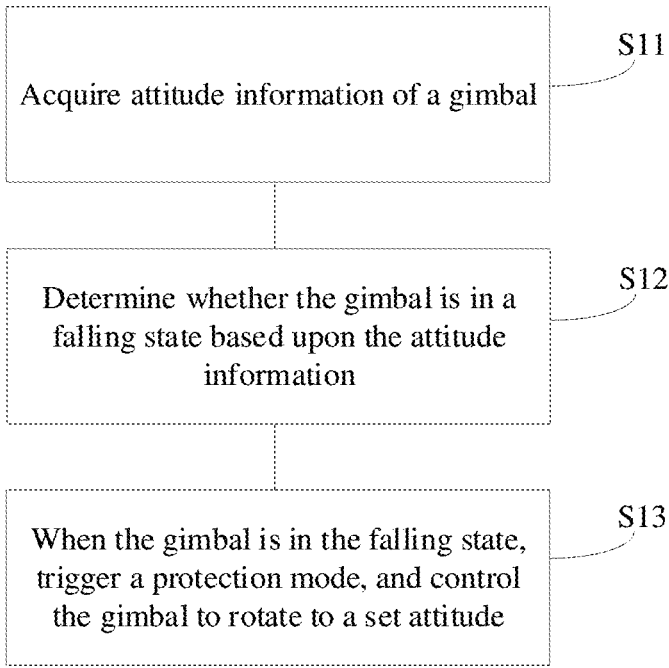
FIG. 1 illustrates a schematic flowchart of a gimbal control method according to some embodiments of the present disclosure.

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, certain steps of the method may be performed in other orders or at the same time; some components/elements can also be disassembled, combined, or partially combined; therefore, the actual arrangement may be changed or modified according to actual conditions. In the case of no conflict, the components, elements, operations/steps, and other features disclosed in the embodiments may be combined with each other. When the following description refers to the drawings, the same numerals in different drawings may represent the same or similar elements unless otherwise indicated.

FIG. 1 illustrates a schematic flowchart of a gimbal control method according to some embodiments of the present disclosure. As shown in FIG. 1, the gimbal control method may include steps S11-S13.

Step S11 may include acquiring attitude information of a gimbal.

Step S12 may include determining whether the gimbal is in a falling state based upon the attitude information.

Step S13 may include, when the gimbal is in the falling state, triggering a protection mode and controlling the gimbal to rotate to a set attitude.

Thus, according to the gimbal control method provided by some embodiments of the present disclosure, when it is determined that the gimbal is in a falling state, the protection mode is triggered, and the gimbal is controlled to rotate to a set attitude, which may be understood as an attitude at which the gimbal is not easy to be broken from falling, thus reducing the probability of the gimbal from being broken, so as to protect the gimbal.

In some embodiments, the attitude information may include motion information. In the above step S12, the determining whether the gimbal is in the falling state based upon the attitude information may further include determining whether the gimbal is in the falling state based upon the motion information. For example, in certain embodiments, the motion information of the gimbal may be detected and acquired by an inertial measurement unit to determine whether the gimbal is in a falling state. In certain embodiments, the height information of a barometer of the gimbal may be used to determine whether the gimbal is in a falling state. In certain embodiments, the image and video information captured by the gimbal may be used to determine whether the gimbal is in a falling state.

In some embodiments, the motion information may include an acceleration, and the determining whether the gimbal is in the falling state based upon the motion information may further include determining whether the gimbal is in the falling state based upon the acceleration. Under normal circumstances, the acceleration of the gimbal during operation is generally not large. However, when the gimbal is dropped from the hand, the acceleration of the gimbal will rise to close to or equal to the acceleration of gravity, so that it can be used to determine whether the gimbal is in a falling state. In certain embodiments, the acceleration information of the gimbal may be detected and acquired through an accelerometer provided inside the gimbal body.

In order to improve the accuracy of determining whether the gimbal is in a falling state, the determining whether the gimbal is in the falling state based upon the acceleration may include the following two scenarios:

(1) When the accelerometer detects that the magnitude of the acceleration of the gimbal is greater than or equal to a first set value, it is determined that the gimbal is in the falling state, the protection mode is triggered, and the gimbal is controlled to rotate to a set attitude at which the gimbal is not easy to be broken from falling, so as to reduce the probability of the gimbal being broken. In certain embodiments, the first set value may be an acceleration value of gravity.

(2) When the accelerometer detects that the magnitude of the acceleration of the gimbal is greater than or equal to the first set value and a duration of the gimbal maintaining the acceleration is not less than a first set time, it is determined that the gimbal is in the falling state, the protection mode is triggered, the gimbal is controlled to rotate to a set attitude at which the gimbal is not easy to be broken from falling, so as to reduce the probability of the gimbal being broken. In certain embodiments, the first set value may be an acceleration value of gravity.

Figure 2:
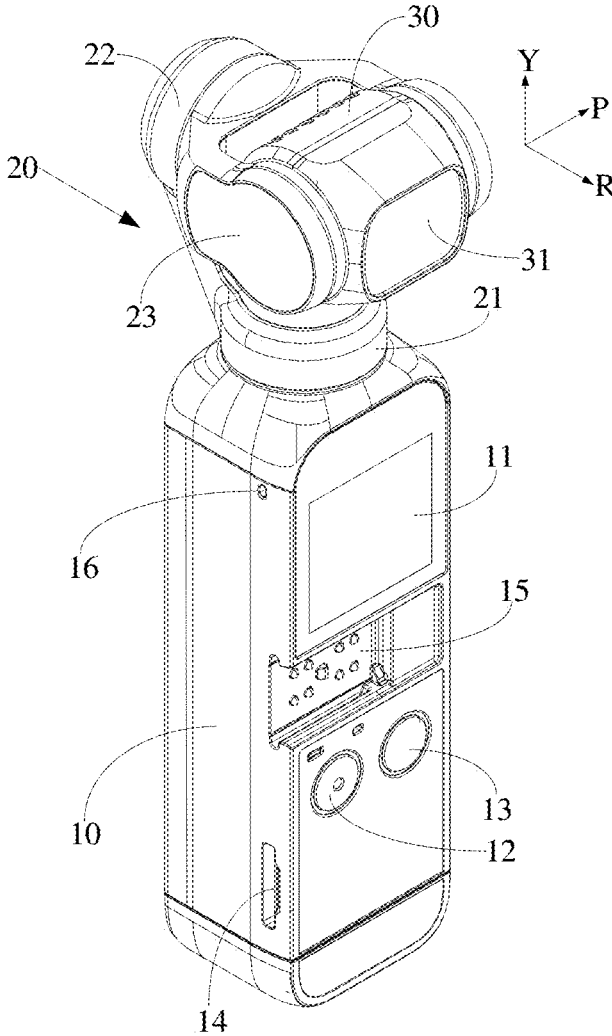
FIG. 2 illustrates a schematic perspective view of a gimbal according to some embodiments of the present disclosure.
Figure 3:
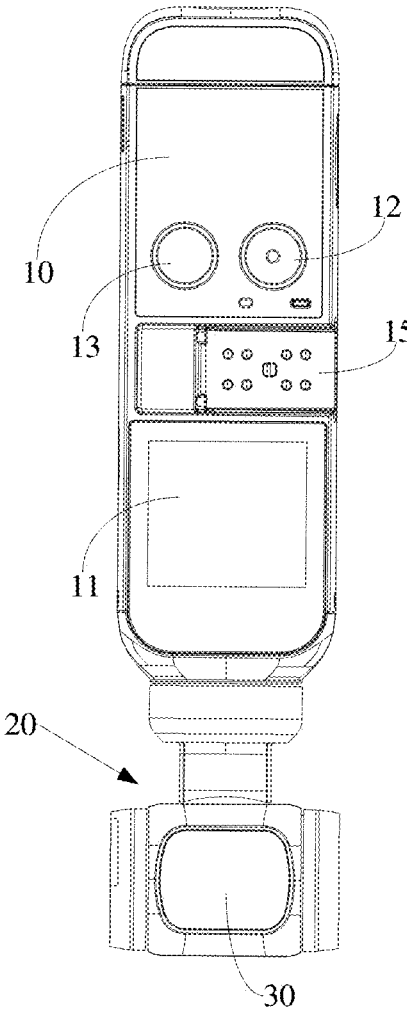
FIG. 3 illustrates a schematic structural diagram of a gimbal in a falling state according to some embodiments of the present disclosure.

FIG. 2 illustrates a schematic perspective view of a gimbal according to some embodiments of the present disclosure. FIG. 3 illustrates a schematic structural diagram of a gimbal in a falling state according to some embodiments of the present disclosure. As shown in FIG. 2 and FIG. 3, in some embodiments, the gimbal may include a handle 10, a gimbal body 20 disposed on the handle 10, and an image capturer 30 mounted on the gimbal body 20. The gimbal body 20 may include a yaw shaft assembly 21, a roll shaft assembly 22 connected with the yaw shaft assembly 21, and a pitch shaft assembly 23 connected with the roll shaft assembly 22. The handle 10 may be provided with a display screen 11, a rocker 12, a button 13, a connection port 14, and an adapter port 15 for connecting an adapter. The connection port 14 may include a data interface and a power interface. The pitch shaft assembly 23 may drive the image capturer 30 to rotate around a pitch axis (as shown in the P direction in FIG. 2). The roll shaft assembly 22 may drive the pitch shaft assembly 23 to rotate around a roll axis (as shown in the R direction in FIG. 2). The yaw shaft assembly 21 may drive the roll shaft assembly 22 to rotate around a yaw axis (as shown in the Y direction in FIG. 2).

In some embodiments, an inertial measurement unit (IMU) may be provided inside the gimbal to detect the angle information and acceleration information of the gimbal. The inertial measurement unit may include an accelerometer and a gyroscope.

In one embodiment, the inertial measurement unit may be arranged in the handle 10, the angle of the handle 10 in the space may be calculated by the inertial measurement unit, and then the gimbal body 20 is controlled to turn to a corresponding set attitude, that is, an angle that gimbal is not easy to be broken from falling, so as to protect the gimbal when it hits the ground.

In another embodiment, the inertial measurement unit may be provided in the image capturer 30. The inertial measurement unit may detect a relative angle of the gimbal body 20 in the space and reversely calculate the relative angle of the handle 10 in the space through the joint angle of the gimbal motor, and then the gimbal body 20 is controlled to turn to a corresponding set attitude, that is, an angle that the gimbal is not easy to be broken from falling, so as to protect the gimbal when the gimbal hits the ground.

In FIG. 2, the gimbal is in a normal state, but in FIG. 3, the gimbal is in a falling state. In the step S13, the controlling the gimbal to rotate to the set attitude may further include, referring to FIG. 4 and FIG. 5, controlling the roll shaft assembly 22 to rotate by a first set angle $\alpha$, so that a distance h between the pitch shaft assembly 23 and the yaw shaft assembly 21 satisfies a set distance. In some embodiments, the set distance may refer to the minimum distance between the pitch shaft assembly 23 and the yaw shaft assembly 21 during the 360° rotation of the roll shaft assembly 22. In this way, the distance between the pitch shaft assembly 23 and the yaw shaft assembly 21 may be made as small as possible, so that the pitch shaft assembly 23 may be as close to a surface (i.e., a surface facing the pitch shaft assembly) of the yaw shaft assembly 21 as possible. When the image capturer 30 of the gimbal falls facing downwards, the image capturer 30 directly hits the ground, with the impact, the pitch shaft assembly 23 used to carry the image capturer 30 is slightly deformed by tending to reduce the h under the action of the impact force. When the deformation is equal to the distance h, the yaw shaft assembly 21 may support the pitch shaft assembly 23 to prevent further deformation of the pitch shaft assembly 23, thereby solving the problems that when the distance between the pitch shaft assembly 23 and the yaw shaft assembly 21 is too large, the resulting deformation of the image capturer 30 due to the collision or the resulting deformation of the motor or the shaft arm of the yaw shaft assembly 21 due to the collision is too large, which protects the gimbal.

Further, in certain embodiments, the distance h may be the maximum distance that the pitch shaft assembly 23 is allowed to deform, that is, the pitch shaft assembly 23 can recover the deformation when the amount of deformation is less than or equal to h, thereby avoiding the permanent damage to the gimbal. When the amount of deformation is greater than h, irreversible damage to the gimbal may occur.

In some embodiments, the range of the first set angle α is 57.5° to 62.5°. In one embodiment, the first set angle α is 60°, which makes the distance between the pitch shaft assembly 23 and the yaw shaft assembly 21 minimal, i.e., the shortest distance between the pitch shaft assembly 23 and the yaw shaft assembly 21 when the roll shaft assembly 22 rotates 360°.

Figure 4:
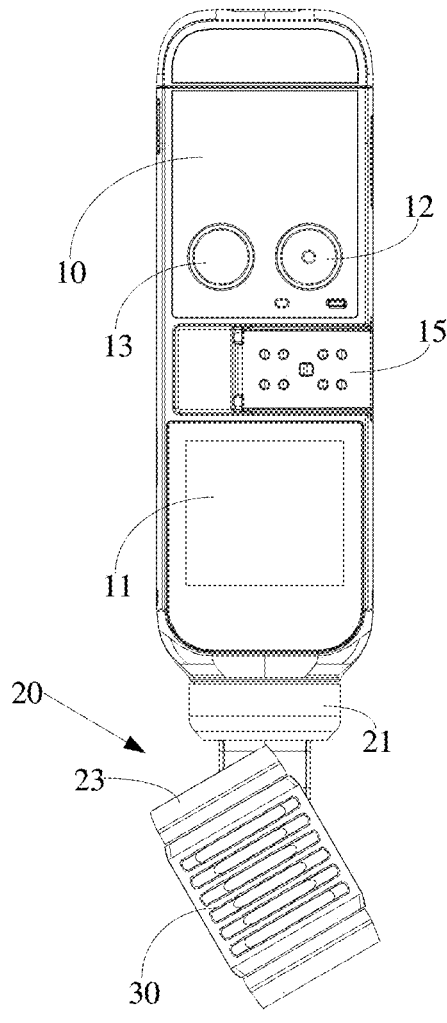
FIGS. 4-7 illustrate schematic state diagrams of a gimbal after triggering a protection mode according to some embodiments of the present disclosure.
Figure 6:
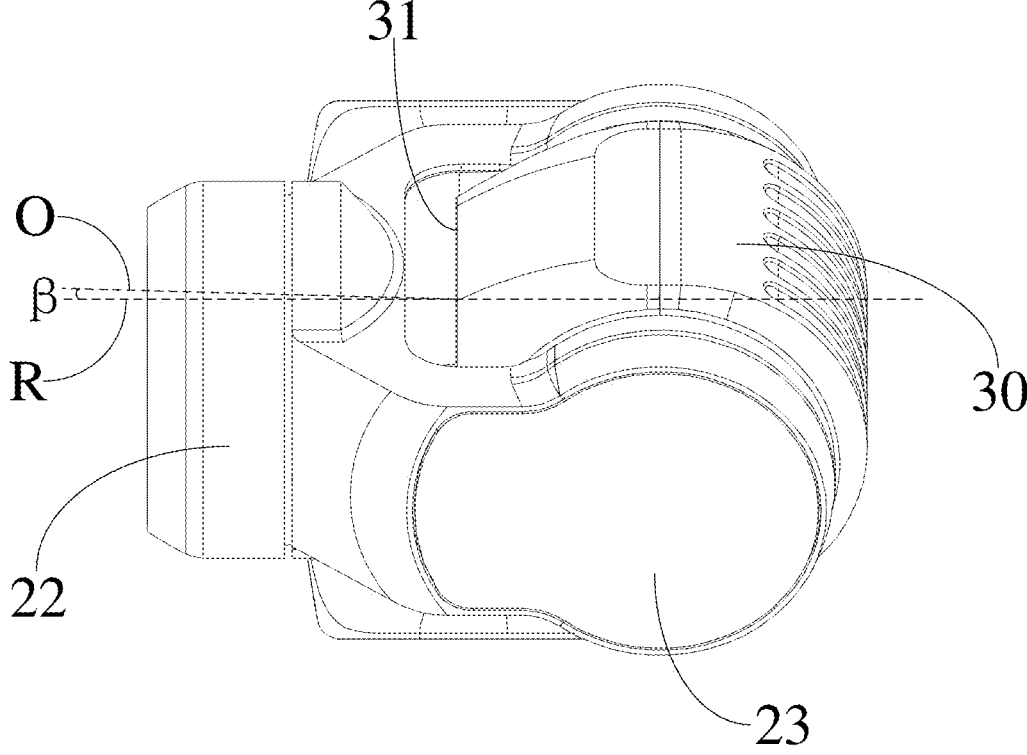

Referring to FIG. 2 to FIG. 4, FIG. 6, and FIG. 7, in some embodiments, the gimbal may include at least one of a limiting structure 16 or an image capturer 30. In the step S13, the controlling the gimbal to rotate to the set attitude may include at least one of the following scenarios:

(1) Referring to FIG. 2 and FIG. 6, the image capturer may include a lens 31, and the pitch shaft assembly 23 may be controlled to rotate by a second set angle, so as to drive the lens 31 of the image capturer 30 to rotate to a direction facing the roll shaft assembly 22. It can be understood that, for example, as shown in FIG. 2, when the gimbal is in a normal state, and the lens of the image capturer 30 is set outward (i.e., facing away from the roll shaft assembly 22) to facilitate shooting. When the gimbal is in a falling state (as shown in FIG. 3), the pitch shaft assembly 23 is controlled to rotate to drive the lens 31 of the image capturer 30 to be set inward (i.e., facing the roll shaft assembly 22), as shown in FIGS. 4 and 6, an included angle β (that is, the angle value of the second set angle) is formed between the axial direction of the lens 31 (as shown in the O direction in FIG. 6) and the roll axis (as shown in the R direction in FIG. 6), which may protect the lens 31 and the lenses of the lens 31. In some embodiments, the range of the second set angle is 177.5° to 182.5°. In one embodiment, the second set angle may be 180°.

Figure 7:
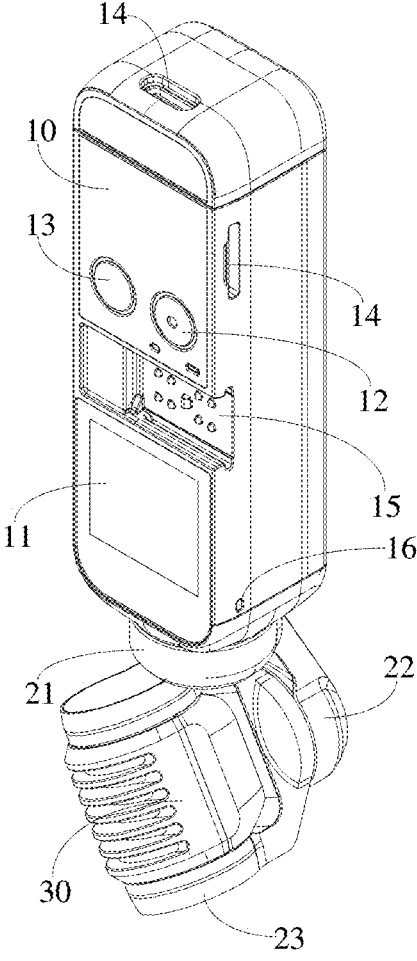

(2) Referring to FIG. 7, the yaw shaft assembly 21 may be controlled to rotate by a third set angle, so as to drive the image capturer 30 to rotate in a direction away from the limiting structure 16, so that the image capturer 30 faces away from the limiting structure 16. Through the above adjustment, rotating the image capturer 30 to a position away from the limiting structure 16 may reduce the possibility of collision between the image capturer 30 and the limiting structure 16 after the gimbal falls, thereby protecting the gimbal. On the other hand, by changing the position of the gimbal, a user may be reminded that the gimbal has dropped, and the protection mode has been triggered, which improves the user experience. In some embodiments, the range of the third set angle is 87.5° to 92.5°. In one embodiment, the third set angle may be 900.

Figure 8:
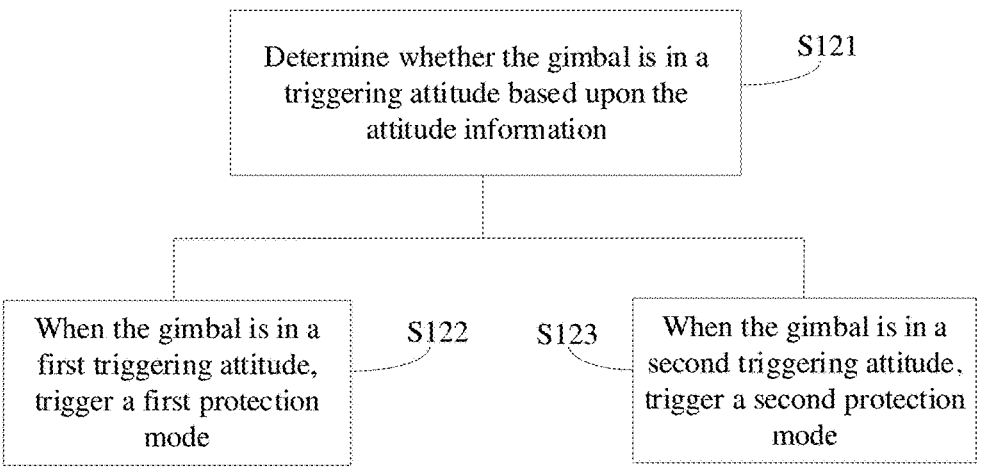
FIGS. 8-11 illustrate detailed flowcharts of a gimbal control method according to some embodiments of the present disclosure.

Referring to FIG. 8, in some embodiments, in the above step S12, the triggering the protection mode when the gimbal is in the falling state may further include steps S121-S123.

Step S121 may include determining whether the gimbal is in a triggering attitude based upon the attitude information.

Step S122 may include, when the gimbal is in a first triggering attitude, triggering a first protection mode.

Step S123 may include, when the gimbal is in a second triggering attitude, triggering a second protection mode.

Since the image capturer 30 may fall facing upwards or downwards when the gimbal falls, different protection modes may be triggered according to different conditions of the gimbal falling, which may better protect the gimbal. Whether the image capturer 30 is dropped facing upwards or downwards may be determined by the positional relationship between the handle 10 and the gimbal body 20. In certain embodiments of the present disclosure, the gimbal being in the first triggering attitude may mean that the image capturer 30 falls facing upwards, and the gimbal being in the second triggering attitude may mean that the image capturer 30 falls facing downwards.

Figure 9:
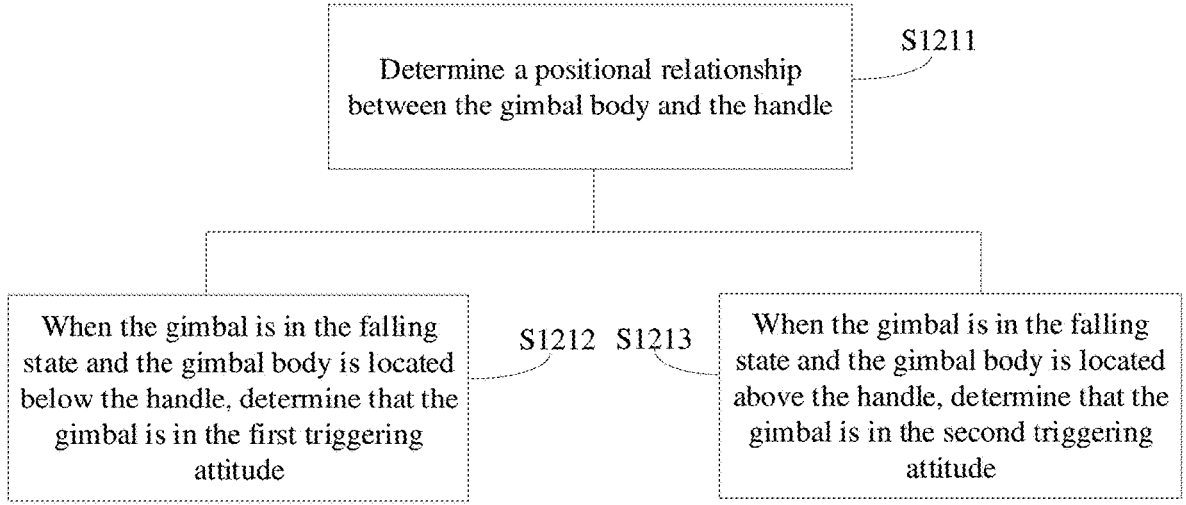

Referring to FIG. 9, in the above step S121, the determining whether the gimbal is in the triggering attitude based upon the attitude information may further include steps S1211-S1213.

Step S1211: Determine a positional relationship between the gimbal body 20 and the handle 10.

Step S1212: When the gimbal is in the falling state and the gimbal body 20 is located below the handle 10, determine that the gimbal is in the first triggering attitude, that is, the image capturer 30 falls facing upwards.

Step S1213: When the gimbal is in the falling state and the gimbal body 20 is located above the handle 10, determine that the gimbal is in the second triggering attitude, that is, the image capturer 30 falls facing downwards.

Figure 10:
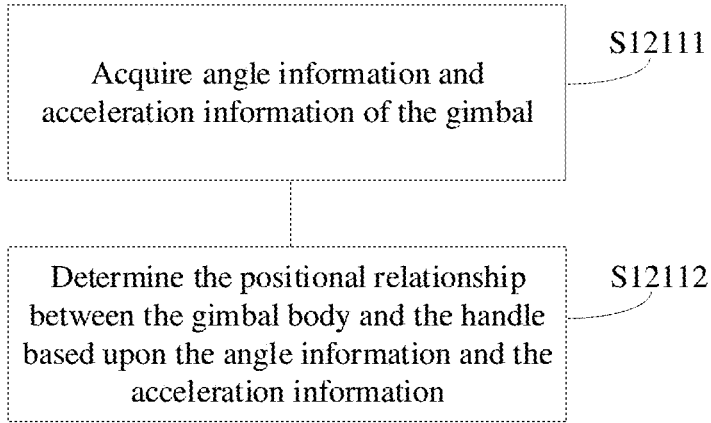

In some embodiments, the positional relationship between the gimbal body 20 and the handle 10 may be determined by an inertial measurement unit. Referring to FIG. 10, in the above step S1211, the determining the positional relationship between the gimbal body 20 and the handle 10 may further include step S12111 and step S12112.

Step S12111 may include acquiring angle information and acceleration information of the gimbal.

Step S12112 may include determining the positional relationship between the gimbal body 20 and the handle 10 based upon the angle information and the acceleration information.

In some embodiments, the image capturer 30 may be provided with an inertial measurement unit, the inertial measurement unit may include an accelerometer, and the accelerometer is used to detect the first attitude information qmesa of the image capturer 30. The second attitude information of the handle 10 is determined based upon the first attitude information of the image capturer 30 and the joint angle of the gimbal. Taking the three-axis gimbal as an example, when the gimbal is in a forward shooting mode, the roll shaft assembly 22 is configured to rotate around the yaw axis, the pitch shaft assembly 23 is configured to rotate around the roll axis, and the image capturer 30 is configured to rotate around the pitch axis. The joint angle of the gimbal may include a yaw joint angle, joint_yaw, a roll joint angle, joint_roll, and a pitch joint angle, joint_pitch, and each joint angle is the joint angle of the corresponding axis motor. q_yaw, q_roll, and q_pitch are obtained according to the axis-angle conversion formula. The conjugate or inverse of q_yaw, q_roll, and q_pitch are q_yaw_inv, q_roll_inv, and q_pitch_inv, respectively. The second attitude information qhandle of the handle 10 may be calculated according to the formula (1):

$$qhandle = qmesa * q\_pitch\_inv * q\_roll\_inv * q\_yaw\_inv \quad (1)$$

where, joint represents a joint angle, and q represents a quaternion.

As described above, different protection modes may be triggered according to different conditions of the gimbal falling. For example, In the above step S1212:

The triggering the first protection mode may include controlling the pitch shaft assembly 23 and the roll shaft assembly 22 to rotate to a first set position, where, in certain embodiments, the controlling the pitch shaft assembly 23 and the roll shaft assembly 22 to rotate to the first set position may refer to controlling the roll shaft assembly 22 to rotate by a first set angle α, so that the distance h between the pitch shaft assembly 23 and the yaw shaft assembly 21 satisfies a set distance; and controlling the pitch shaft assembly 23 to rotate by a second set angle, so as to drive the lens 31 of the image capturer 30 to rotate to a direction facing towards the roll shaft assembly 22. In this way, when the gimbal falls to the ground, the lens 31 and the lenses of the lens 31 may be protected, and the yaw shaft assembly 21 may support the pitch shaft assembly 23, avoiding the deformation of the image capturer 30 or the deformation of the motor or the shaft arm of the yaw shaft assembly 21, resulted by the excessively large distance between the pitch shaft assembly 23 and the yaw shaft assembly 21, due to the collision, thereby protecting the gimbal.

The triggering the second protection mode may include controlling the pitch shaft assembly 23 to rotate to a second set position. In certain embodiments, the controlling the pitch shaft assembly 23 to rotate to the second set position may refer to controlling the yaw shaft assembly 21 to rotate to a third set angle, so as to drive the image capturer 30 to rotate towards a direction facing away from the limiting structure 16 so that the image capturer 30 faces away from the limiting structure 16. In this way, by rotating the image capturer 30 to a position away from the limiting structure 16, on the one hand, the possibility of collision between the image capturer 30 and the limiting structure 16 may be reduced after the gimbal falls, so as to protect the gimbal. On the other hand, by changing the position of the gimbal, a user may be reminded that the gimbal has dropped, and the protection mode has been triggered, thereby improving the user experience.

Figure 11:
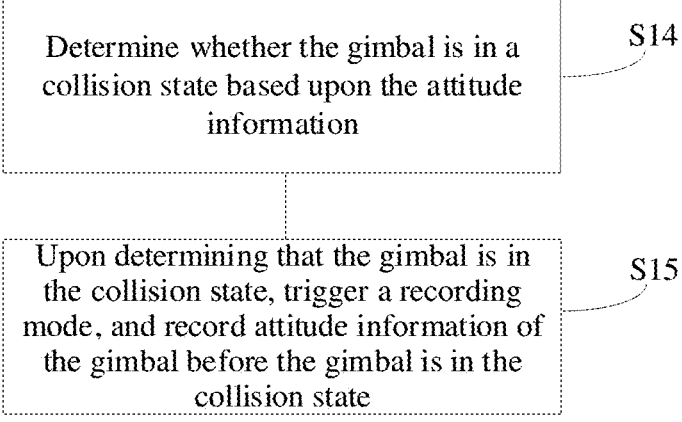

Referring to FIG. 11, in some embodiments, after the above step S13, that is, after the controlling the gimbal to rotate to the set attitude, the gimbal control method may further include step S14 and step S15.

Step S14 may include determining whether the gimbal is in a collision state based upon the attitude information.

Step S15 may include, upon determining that the gimbal is in the collision state, triggering a recording mode, recording attitude information of the gimbal before the gimbal is in the collision state, and deducing the entire falling situation through a time integration to improve the user experience.

In some embodiments, the attitude information may include motion information. In the step S14, the determining whether the gimbal is in the collision state based upon the attitude information may further include determining whether the gimbal is in the collision state based upon the motion information. In certain embodiments, an inertial measurement unit may detect and acquire the motion information of the gimbal to determine whether the gimbal is in a collision state. In certain embodiments, the height information of the barometer may be used to determine whether the gimbal is in a collision state. In certain embodiments, the image and video information captured by the gimbal may be used to determine whether the gimbal is in a collision state.

In some embodiments, the motion information may include an acceleration, and the determining whether the gimbal is in the collision state based upon the motion information may further include determining whether the gimbal is in the collision state based upon the acceleration. Under normal circumstances, the acceleration of the gimbal during operation is generally not large. When the gimbal falls, the acceleration of the gimbal is close to or equal to the acceleration of gravity. When the gimbal collides, the acceleration of the gimbal will rise sharply and exceed the acceleration of gravity, so that the acceleration may be used to determine whether the gimbal is in a collision state. In certain embodiments, the acceleration information of the gimbal may be detected and acquired through an accelerometer disposed inside the gimbal body.

In order to improve the accuracy of determining whether the gimbal is in the collision state, the determining whether the gimbal is in the collision state based upon the acceleration may further include, when the magnitude of the acceleration is greater than or equal to a first set value and the duration of the acceleration is not less than a second set time, determining that the gimbal is in the collision state. The attitude information of the gimbal before the gimbal is in the collision state is recorded, and the entire falling situation may be reversely deduced through the time integration, so as to improve the user experience. In one embodiment, the first set value may be an acceleration value of gravity.

In some embodiments, in the step S11, the acquiring the attitude information of the gimbal may further include detecting and acquiring the attitude information of the gimbal in real time when the gimbal is operating, so as to adjust the gimbal to the set attitude in real time to reduce the probability of the gimbal being dropped and damaged, thus protecting the gimbal.

In some embodiments, the gimbal may include an inertial measurement unit, a control decision module, an execution module, and a recording module. The gimbal control method may be implemented through the following steps:

Step 1: Connect the gimbal to a client (such as a mobile phone, etc.) for communication, where an APP of the client may be set to enable a drop protection mode (i.e., trigger a protection mode).

Step 2: Collect acceleration information ($a_x$, $a_y$, $a_z$) and angle information ($rot_x$, $rot_y$, $rot_z$) of the gimbal in real time through the inertial measurement unit.

Step 3: Perform, by the control decision module, drop detection and collision detection based upon the acceleration information and angle information of the gimbal collected in real time by the inertial measurement unit, and determine whether the gimbal is in a falling or collision state based upon a current acceleration a $$\left(a = \sqrt[2]{a_x^2 + a_y^2 + a_z^2}\right)$$

of the gimbal and a duration T; If the current acceleration of the gimbal is equal to the acceleration of gravity and the duration T is not less than a minimum drop triggering time $T_{min1}$, trigger the drop protection mode, and perform, by the execution module, the following steps 4 and 5; If the current acceleration of the gimbal is not lower than a collision-triggering minimum acceleration $a_{min}$ and the duration T is not lower than a collision-triggering minimum time $T_{min2}$, trigger the drop protection mode, and execute, by the execution module, the following step 6.

Step 4: Output, by the control decision module, a control signal for the execution module based upon real-time data collected by the inertial measurement unit and an internal preset protection algorithm.

Step 5: Control, by the execution module, the gimbal to move to a corresponding set attitude based upon the control signal output by the control decision module, so as to reduce the probability of the gimbal being broken from falling, thereby protecting the gimbal.

Step 6: Record, by the recording module, the acceleration information and angle information of the gimbal before the gimbal has the collision, and reversely deduce the entire falling situation through a time integration to improve the user experience.

Step 7: Repeat the above steps 2-6 to detect and adjust the attitude of the gimbal in real time, so that the gimbal is always in the set attitude during a falling process, reducing the probability of the gimbal being broken from falling, thereby protecting the gimbal.

Referring to FIG. 2, the present disclosure further provides a gimbal. The gimbal may be a gimbal with an image capturer, a gimbal without an image capturer, or a gimbal of various types of unmanned aerial vehicles. The gimbal may include a gimbal body 20 and a processor electrically connected to the gimbal body 20, and the processor is configured to:

determine whether the gimbal is in a falling state based upon attitude information of the gimbal; and upon determining that the gimbal is in the falling state, trigger a protection mode and control the gimbal body to rotate to a set attitude.

In the gimbal of the present disclosure, when the processor of the gimbal determines that the gimbal is in a falling state, it triggers the protection mode and controls the gimbal to rotate to a set attitude, which may be understood as an attitude at which the gimbal is not easy to be broken from falling, so as to reduce the probability that the gimbal is broken from falling, thereby protecting the gimbal.

In some embodiments, the gimbal may further include an acquisition unit or circuitry for collecting attitude information of the gimbal, which is electrically connected to the processor. The acquisition unit is configured to send the collected attitude information of the gimbal to the processor, so that the processor may determine whether the gimbal is in a falling state based upon the attitude information of the gimbal. In certain embodiments, the acquisition unit may also be used to detect and acquire the attitude information of the gimbal in real time when the gimbal is operating, so that the processor may adjust the gimbal to the set attitude in real time based upon the real-time detection results when the gimbal falls, so as to reduce probability of the gimbal being broken from falling, thereby protecting the gimbal.

In some embodiments, the acquisition unit may include an inertial measurement unit for acquiring angle information and acceleration information of the gimbal, and the inertial measurement unit is electrically connected to the processor. The inertial measurement unit is configured to send the collected angle information and acceleration information of the gimbal to the processor, so that the processor may determine whether the gimbal is in a falling state based upon the attitude information of the gimbal.

In some embodiments, the attitude information may include motion information, the inertial measurement unit is used to collect the motion information of the gimbal and send the collected motion information to the processor, and the processor is configured to determine whether the gimbal is in a falling state based upon the motion information.

The motion information may include an acceleration, and the processor is configured to determine whether the gimbal is in a falling state based upon the acceleration. Under normal circumstances, the acceleration of the gimbal during operation is generally not large. However, when the gimbal is dropped from the hand, the acceleration of the gimbal will rise to close to or equal to the acceleration of gravity; therefore, the acceleration may be used to determine whether the gimbal is in a falling state.

In order to improve the accuracy of determining whether the gimbal is in a falling state, the processor is further configured to:

when the magnitude of the acceleration of the gimbal is greater than or equal to a first set value, determine that the gimbal is in the falling state, trigger the protection mode, and control the gimbal to rotate to the set attitude at which the gimbal is not easy to be broken from falling, so as to reduce the probability of the gimbal being broken from falling, where, in certain embodiments, the first set value may be an acceleration value of gravity; or when the magnitude of the acceleration is greater than or equal to the first set value and a duration of the acceleration is not less than a first set time, determine that the gimbal is in the falling state, trigger the protection mode, and control the gimbal to rotate to the set attitude at which the gimbal is not easy to broken from falling, so as to reduce the probability of the gimbal being broken from falling, where, in certain embodiments, the first set value may be an acceleration value of gravity.

Referring to FIG. 2 and FIG. 3, in some embodiments, the gimbal may include a handle 10, a gimbal body 20 disposed on the handle 10, and an image capturer 30 mounted on the gimbal body 20. The gimbal body 20 may include a yaw shaft assembly 21, a roll shaft assembly 22 connected with the yaw shaft assembly 21, and a pitch shaft assembly 23 connected with the roll shaft assembly 22. The handle 10 may be provided with a display screen 11, a rocker 12, a button 13, a connection port 14, and an adapter port 15 for connecting an adapter. The connection port 14 may include a data interface and a power interface.

In some embodiments, an inertial measurement unit (IMU) may be provided inside the gimbal to detect the angle information and acceleration information of the gimbal. The inertial measurement unit may include an accelerometer and a gyroscope.

In one embodiment, the inertial measurement unit may be arranged in the handle 10, the angle of the handle 10 in the space may be calculated by the inertial measurement unit, and then the gimbal body 20 is controlled to turn to a corresponding set attitude, that is, an angle that gimbal is not easy to be broken from falling, so as to protect the gimbal when it hits the ground.

In another embodiment, the inertial measurement unit may be provided in the image capturer 30. The inertial measurement unit may detect a relative angle of the gimbal body 20 in the space and reversely calculate the relative angle of the handle 10 in the space through the joint angle of the gimbal motor, and then the gimbal body 20 is controlled to turn to a corresponding set attitude, that is, an angle that the gimbal is not easy to be broken from falling, so as to protect the gimbal when the gimbal hits the ground.

Figure 5:
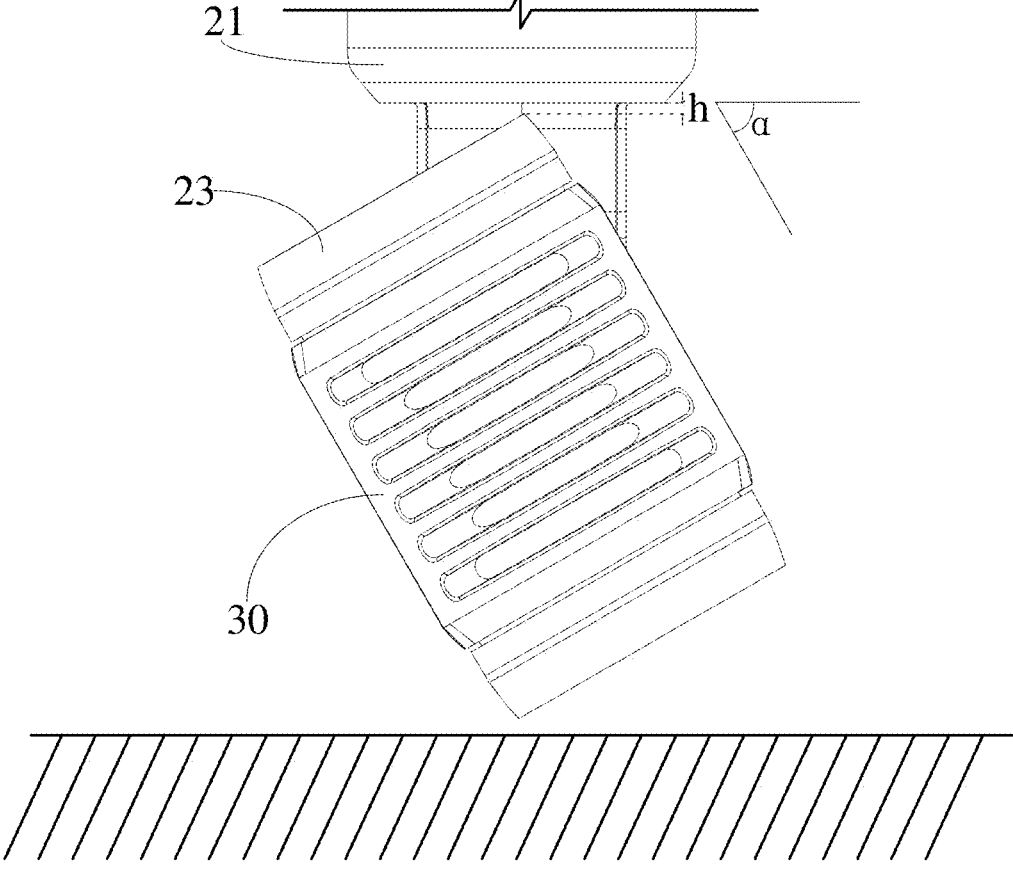

In FIG. 2, the gimbal is in a normal state, but in FIG. 3, the gimbal is in a falling state. Referring to FIG. 4 and FIG. 5, the processor is further configured to control the roll shaft assembly 22 to rotate by a first set angle α, so that a distance h between the pitch shaft assembly 23 and the yaw shaft assembly 21 satisfies a set distance. In some embodiments, the set distance may refer to the minimum distance between the pitch shaft assembly 23 and the yaw shaft assembly 21 during the 360° rotation of the roll shaft assembly 22. In this way, the distance between the pitch shaft assembly 23 and the yaw shaft assembly 21 may be made as short as possible, so that the pitch shaft assembly 23 may be as close to a surface (i.e., a surface facing the pitch shaft assembly) of the yaw shaft assembly 21 as possible. When the gimbal hits the ground, the yaw shaft assembly 21 may support the pitch shaft assembly 23 to prevent the deformation of the image capturer 30 or the deformation of the motor or the shaft arm of the yaw shaft assembly 21, caused by the excessively large distance between the pitch shaft assembly 23 and the yaw shaft assembly 21, due to the collision, thereby protecting the gimbal.

In some embodiments, the range of the first set angle α is 57.5° to 62.5°. In one embodiment, the first set angle α is 60°, which makes the distance between the pitch shaft assembly 23 and the yaw shaft assembly 21 minimal, i.e., the shortest distance between the pitch shaft assembly 23 and the yaw shaft assembly 21 when the roll shaft assembly 22 rotates 360°.

Referring to FIG. 2 to FIG. 4, FIG. 6, and FIG. 7, in some embodiments, the gimbal may include at least one of a limiting structure 16 or an image capturer 30. The processor is further configured to implement at least one of the followings:

(1) Referring to FIG. 2 and FIG. 6, the image capturer may include a lens 31, and the processor is further configured to control the pitch shaft assembly 23 to rotate by a second set angle, so as to drive the lens 31 of the image capturer 30 to rotate to a direction facing the roll shaft assembly 22. It can be understood that, for example, as shown in FIG. 2, when the gimbal is in a normal state, and the lens of the image capturer 30 is set outward (i.e., facing away from the roll shaft assembly 22) to facilitate shooting. When the gimbal is in a falling state, the pitch shaft assembly 23 is controlled to rotate to drive the lens 31 of the image capturer 30 to be set inward (i.e., facing the roll shaft assembly 22), which may protect the lens 31 and the lenses of the lens 31. In some embodiments, the range of the second set angle is 177.5° to 182.5°. In one embodiment, the second set angle may be 180°.

(2) Referring to FIG. 7, the processor is further configured to control the yaw shaft assembly 21 to rotate by a third set angle, so as to drive the image capturer 30 to rotate in a direction away from the limiting structure 16, so that the image capturer 30 faces away from the limiting structure 16. Through the above adjustment, rotating the image capturer 30 to a position away from the limiting structure 16 may reduce the possibility of collision between the image capturer 30 and the limiting structure 16 after the gimbal falls, thereby protecting the gimbal. On the other hand, by changing the position of the gimbal, a user may be reminded that the gimbal has dropped, and the protection mode has been triggered, which improves the user experience. In some embodiments, the range of the third set angle is 87.5° to 92.5°. In one embodiment, the third set angle may be 90°.

Referring to FIG. 8, in some embodiments, the processor is further configured to:

determine whether the gimbal is in a triggering attitude based upon the attitude information;

when the gimbal is in a first triggering attitude, trigger a first protection mode; and when the gimbal is in a second triggering attitude, trigger a second protection mode.

Since the image capturer 30 may fall facing upwards or downwards when the gimbal falls, the processor may trigger different protection modes according to different conditions of the gimbal falling, which may better protect the gimbal. Whether the image capturer 30 is dropped facing upwards or downwards may be determined by the positional relationship between the handle 10 and the gimbal body 20. In certain embodiments of the present disclosure, the gimbal being in the first triggering attitude may mean that the image capturer 30 falls facing upwards, and the gimbal being in the second triggering attitude may mean that the image capturer 30 falls facing downwards.

Referring to FIG. 9, in some embodiments, the processor is further configured to:

determine a positional relationship between the gimbal body 20 and the handle 10;

when the gimbal is in the falling state and the gimbal body 20 is located below the handle 10, determine that the gimbal is in the first triggering attitude, that is, the image capturer 30 falls facing upwards; or when the gimbal is in the falling state and the gimbal body 20 is located above the handle 10, determine that the gimbal is in the second triggering attitude, that is, the image capturer 30 falls facing downwards.

In some embodiments, the angle information and the acceleration information of the gimbal may be acquired through an inertial measurement unit. The processor is further configured to determine the positional relationship between the gimbal body 20 and the handle 10 based upon the acquired angle information and acceleration information of the gimbal.

In some embodiments, the image capturer 30 may be provided with an inertial measurement unit, the inertial measurement unit may include an accelerometer, and the accelerometer is used to detect the first attitude information qmesa of the image capturer 30. The second attitude information of the handle 10 is determined based upon the first attitude information of the image capturer 30 and the joint angle of the gimbal. Taking the three-axis gimbal as an example, when the gimbal is in a forward shooting mode, the roll shaft assembly 22 is configured to rotate around the yaw axis, the pitch shaft assembly 23 is configured to rotate around the roll axis, and the image capturer 30 is configured to rotate around the pitch axis. The joint angle of the gimbal may include a yaw joint angle, joint_yaw, a roll joint angle, joint_roll, and a pitch joint angle, joint_pitch, and each joint angle is the joint angle of the corresponding axis motor. q_yaw, q_roll, and q_pitch are obtained according to the axis-angle conversion formula. The conjugate or inverse of q_yaw, q_roll, and q_pitch are q_yaw_inv, q_roll_inv, and q_pitch_inv, respectively. The second attitude information qhandle of the handle 10 may be calculated according to the following formula:

$$qhandle = qmesa * q\_pitch\_inv * q\_roll\_inv * q\_yaw\_inv$$

where, joint represents a joint angle, and q represents a quaternion.

As described above, the processor may trigger different protection modes according to different conditions of the gimbal falling; thus, the processor may be further configured to:

Trigger the first protection mode and control the pitch shaft assembly 23 and the roll shaft assembly 22 to rotate to a first set position, where the controlling the pitch shaft assembly 23 and the roll shaft assembly 22 to rotate to the first set position may refer to controlling the roll shaft assembly 22 to rotate by a first set angle α, so that the distance h between the pitch shaft assembly 23 and the yaw shaft assembly 21 satisfies a set distance; and control the pitch shaft assembly 23 to rotate by a second set angle, so as to drive the lens 31 of the image capturer 30 to rotate to a direction facing towards the roll shaft assembly 22. In this way, when the gimbal falls to the ground, the lens 31 and the lenses of the lens 31 may be protected, and the yaw shaft assembly 21 may support the pitch shaft assembly 23, avoiding the deformation of the image capturer 30 or the deformation of the motor or the shaft arm of the yaw shaft assembly 21, resulted by the excessively large distance between the pitch shaft assembly 23 and the yaw shaft assembly 21, due to the collision, thereby protecting the gimbal;

Trigger the second protection mode and control the pitch shaft assembly 23 to rotate to a second set position. In certain embodiments, the controlling the pitch shaft assembly 23 to rotate to the second set position may refer to controlling the yaw shaft assembly 21 to rotate to a third set angle, so as to drive the image capturer 30 to rotate towards a direction facing away from the limiting structure 16, so that the image capturer 30 faces away from the limiting structure 16. In this way, by rotating the image capturer 30 to a position away from the limiting structure 16, on the one hand, the possibility of collision between the image capturer 30 and the limiting structure 16 may be reduced after the gimbal falls, so as to protect the gimbal. On the other hand, by changing the position of the gimbal, a user may be reminded that the gimbal has dropped, and the protection mode has been triggered, thereby improving the user experience.

In some embodiments, the processor is further configured to:

after controlling the gimbal to rotate to the set attitude, determine whether the gimbal is in a collision state based upon the attitude information; and trigger a recording mode when it is determined that the gimbal is in the collision state, record attitude information of the gimbal before the gimbal is in the collision state, and deduce the entire falling situation through a time integration to improve the user experience. In certain embodiments, the attitude information may include motion information, and the processor is further configured to determine whether the gimbal is in the collision state based upon the motion information.

In some embodiments, the motion information may include an acceleration, and the processor is further configured to determine whether the gimbal is in the collision state based upon the acceleration. Under normal circumstances, the acceleration of the gimbal during operation is generally not large. When the gimbal falls, the acceleration of the gimbal is close to or equal to the acceleration of gravity. When the gimbal collides, the acceleration of the gimbal will rise sharply and exceed the acceleration of gravity, so the processor may use the acceleration to determine whether the gimbal is in a collision state.

In order to improve the accuracy of determining whether the gimbal is in the collision state, when determining whether the gimbal is in the collision state based upon the acceleration, the processor is further configured to: when the magnitude of the acceleration is greater than or equal to a first set value and the duration of the acceleration is not less than a second set time, determine that the gimbal is in the collision state; record the attitude information of the gimbal before the gimbal is in the collision state; and deduce the entire falling situation through a time integration, so as to improve the user experience. In one embodiment, the first set value may be an acceleration value of gravity.

The present disclosure further provides a computer-readable storage medium having stored a computer program thereon. The computer program may include program instructions, which may be executed by a processor to cause the processor to implement the steps of any of the gimbal control methods provided in the foregoing method embodiments.

The computer-readable storage medium may be an internal storage unit of the gimbal described in any of the foregoing embodiments, such as a hard disk or a memory of the gimbal. The computer-readable storage medium may also be an external storage device of the gimbal, such as a plug-in hard disk, a smart media card (SMC), and a secure digital (SD) card, a flash card, etc., equipped on the gimbal.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program, program instructions and/or program codes described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer program/program instructions/program codes for storage in a computer readable storage medium within the computing or processing device.

The computer program, program instructions and/or program codes for carrying out operations of the present disclosure may include machine language instructions and/or microcode, which may be compiled or interpreted from source code written in any combination of one or more programming languages, including assembly language, Basic, Fortran, Java, Python, R, C, C++, C #, or similar programming languages. the computer program/program instructions/program codes may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer program/program instructions/program codes by using information from the computer program/program instructions/program codes to configure or customize the electronic circuitry, in order to perform aspects of the present disclosure.

The computer program, program instructions and/or program codes that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. The computer program/program instructions/program codes may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer program, program instructions and/or program codes may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation;

Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage, and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Each part of the present disclosure may be implemented by hardware, software, firmware, or a combination thereof. In the above exemplary embodiments, multiple steps or methods may be implemented by hardware or software stored in a memory and executed by a suitable instruction execution system.

It is understandable that the disclosed device and method may be implemented in other manners. For example, the device embodiments described above are merely schematic, the division of the units and modules is merely a logical function division, and in actual implementation, there may be another division manner, for example, multiple units, modules, or components may be combined or integrated into another system, or some features may be ignored or not performed. In addition, the displayed or discussed mutual coupling or direct coupling or communication connection can be indirect coupling or communication connection through some interfaces, devices, or units, and can be in electrical, mechanical, or other forms.

The units and modules described as separate parts may or may not be physically separate, and parts displayed as units/modules may or may not be physical units, that is, may be located in one place, or may be distributed on a plurality of network units. Some or all of the units/modules can be selected according to actual requirements to achieve the purpose of the scheme of the embodiment. In addition, functional units in the embodiments of the present disclosure may be integrated into one processing unit, or each of the units may exist alone physically, or two or more units may be integrated into one unit. The integrated unit may be realized in the form of hardware and may also be realized in the form of a hardware plus software functional unit.

Unless otherwise defined, all technical and scientific terms used herein have the same meaning as commonly understood by those skilled in the technical field of the present disclosure. The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. The term "based upon" used herein may be understood as not necessarily intended to convey an exclusive set of factors and may, instead, allow for existence of additional factors not necessarily expressly described, depending at least in part on context. Terms such as "connected" or "linked" are not limited to physical or mechanical connections, and may include electrical connections, whether direct or indirect. Phrases such as "a plurality of," "multiple." or "several" mean two and more.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It should be noted that in the instant disclosure, relational terms such as "first" and "second", etc. are used herein merely to distinguish one entity or operation from another entity or operation without necessarily requiring or implying any such actual relationship or order between such entities or operations. The terms "comprise/comprising", "include/ including", "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/ examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A gimbal control method, comprising:
acquiring attitude information of a gimbal;
determining whether the gimbal is in a falling state based upon the attitude information; and
upon determining that the gimbal is in the falling state, triggering a protection mode and controlling the gimbal to rotate to a set attitude;
wherein the triggering the protection mode when the gimbal is in the falling state comprises:
determining whether the gimbal is in a triggering attitude based upon the attitude information; and
upon determining that the gimbal is in a triggering attitude, triggering the protection mode, wherein the gimbal comprises a support and a gimbal body arranged on the support, and the gimbal body is located below the support when the gimbal is in the triggering attitude.

2. The gimbal control method of claim 1, wherein the attitude information comprises motion information, and the determining whether the gimbal is in the falling state based upon the attitude information comprises:
determining whether the gimbal is in the falling state based upon the motion information.

3. The gimbal control method of claim 2, wherein the motion information comprises an acceleration, and the determining whether the gimbal is in the falling state based upon the motion information comprises:
determining whether the gimbal is in the falling state based upon the acceleration.

4. The gimbal control method of claim 3, wherein the determining whether the gimbal is in the falling state based upon the acceleration comprises:
under a condition that a magnitude of the acceleration is greater than or equal to a first set value, determining that the gimbal is in the falling state; or
under a condition that the magnitude of the acceleration is greater than or equal to the first set value and a duration of the acceleration is not less than a first set time, determining that the gimbal is in the falling state.

5. The gimbal control method of claim 4, wherein the first set value is an acceleration value of gravity.

6. The gimbal control method of claim 1, wherein the triggering attitude is a first triggering attitude, the protection mode is a first protection mode, and the triggering the protection mode when the gimbal is in the falling state further comprises:
upon determining that the gimbal is in a second triggering attitude, triggering a second protection mode.

7. The gimbal control method of claim 6, wherein the gimbal body is located above the support when the gimbal is in the second triggering attitude.

8. The gimbal control method of claim 7, wherein the determining the positional relationship between the gimbal body and the support comprises:
acquiring angle information and acceleration information of the gimbal; and
based upon the angle information and the acceleration information, determining the positional relationship between the gimbal body and the handle support.

9. The gimbal control method of claim 6, wherein the gimbal comprises a yaw shaft assembly, a roll shaft assembly connected to the yaw shaft assembly, and a pitch shaft assembly connected to the roll shaft assembly;
wherein the triggering the first protection mode comprises controlling the pitch shaft assembly and the roll shaft assembly to rotate to a first set position; and
wherein the triggering the second protection mode comprises controlling the pitch shaft assembly to rotate to a second set position.

10. The gimbal control method of claim 1, wherein the gimbal comprises a yaw shaft assembly, a roll shaft assembly connected to the yaw shaft assembly, and a pitch shaft assembly connected to the roll shaft assembly, and the controlling the gimbal to rotate to the set attitude comprises:
controlling the roll shaft assembly to rotate by a first set angle, so that a distance between the pitch shaft assembly and the yaw shaft assembly satisfies a set distance.

11. The gimbal control method of claim 10, wherein the gimbal further comprises at least one of a limiting structure or an image capturer mounted on the pitch shaft assembly; and the controlling the gimbal to rotate to the set attitude further comprises at least one of:
controlling the pitch shaft assembly to rotate by a second set angle, so as to drive the image capturer to rotate to a direction facing the roll shaft assembly; or controlling the yaw shaft assembly to rotate by a third set angle, so as to drive the image capturer to rotate in a direction away from the limiting structure.

12. The gimbal control method of claim 1, wherein after controlling the gimbal to rotate to the set attitude, the gimbal control method further comprises:

determining whether the gimbal is in a collision state based upon the attitude information; and upon determining that the gimbal is in the collision state, triggering a recording mode and recording the attitude information of the gimbal before the gimbal is in the collision state.

13. The gimbal control method of claim 12, wherein the attitude information comprises motion information, and the determining whether the gimbal is in the collision state based upon the attitude information comprises:

determining whether the gimbal is in the collision state based upon the motion information.

14. The gimbal control method of claim 1, wherein the acquiring the attitude information of the gimbal comprises detecting and acquiring the attitude information of the gimbal in real time when the gimbal is operating.

15. The gimbal control method of claim 1, wherein the support includes a handle.

16. The gimbal control method of claim 1, wherein the set attitude includes that the gimbal body is tilted relative to the support.

17. The gimbal control method of claim 1, wherein the set attitude includes that a roll axis of the gimbal body is tilted relative to the support with a tilt angle, and the tilt angle is not 90°.

18. The gimbal control method of claim 1, wherein the gimbal further comprises an image capturer mounted on the gimbal body, and an angle is formed between an axis of a lens of the image capturer and a roll axis of the gimbal body when the gimbal is in the triggering attitude.

19. A gimbal comprising a gimbal body and a processor electrically connected to the gimbal body, the processor being configured to:

determine whether the gimbal is in a falling state based upon attitude information of the gimbal; and upon determining that the gimbal is in the falling state, trigger a protection mode, and control the gimbal to rotate to a set attitude;

wherein the triggering the protection mode when the gimbal is in the falling state comprises:

determining whether the gimbal is in a triggering attitude based upon the attitude information; and upon determining that the gimbal is in a triggering attitude, triggering the protection mode, wherein the gimbal comprises a support and a gimbal body arranged on the support, and the gimbal body is located below the support when the gimbal is in the triggering attitude.

20. A gimbal control method, comprising:

acquiring attitude information of a gimbal;

determining whether the gimbal is in a falling state based upon the attitude information; and upon determining that the gimbal is in the falling state, triggering a protection mode and controlling the gimbal to rotate to a set attitude;

wherein the gimbal comprises a yaw shaft assembly, a roll shaft assembly connected to the yaw shaft assembly, and a pitch shaft assembly connected to the roll shaft assembly, and the controlling the gimbal to rotate to the set attitude comprises:

controlling the roll shaft assembly to rotate by a first set angle, so that a distance between the pitch shaft assembly and the yaw shaft assembly satisfies a set distance.

\*   \*   \*   \*   \*